United States Patent [19]

Warmann

[11] Patent Number: 4,518,450

[45] Date of Patent: May 21, 1985

[54] LABEL DISPENSING APPARATUS

[76] Inventor: Bruno D. Warmann, 15362 Fairlane Dr., Livonia, Mich. 48154

[21] Appl. No.: 559,213

[22] Filed: Dec. 8, 1983

[51] Int. Cl.[3] .............................................. B32B 31/00

[52] U.S. Cl. .................................... 156/566; 156/542; 156/584

[58] Field of Search ............... 156/361, 542, 526, 384, 156/584

[56] References Cited

U.S. PATENT DOCUMENTS

| | | | |
|---|---|---|---|
| 3,238,080 | 3/1966 | Schluter | 156/542 X |
| 3,427,214 | 2/1969 | Voigt | 156/542 X |
| 3,682,743 | 8/1972 | Cleary et al. | 156/384 |
| 3,775,219 | 11/1973 | Karlson et al. | 156/526 X |
| 3,793,114 | 2/1974 | Thomas | 156/542 X |
| 4,017,350 | 4/1977 | Thomas | 156/542 X |

*Primary Examiner*—David Simmons

*Attorney, Agent, or Firm*—Basile, Weintraub & Hanlon

[57] ABSTRACT

An automatic label dispensing apparatus for dispensing a label on an article to be marked is disclosed. The apparatus includes provisions for the mounting of a conventional label ejector mechanism adapted to eject in serial format adhesive-backed labels on articles as the same are positioned thereunder. A horizontal support member is provided for positioning the ejector mechanism in a selected radial position and includes a pivot arm attached thereto which supports the ejector mechanism in position for operation. A pneumatic system is provided for arming the ejector mechanism, and in time relation the arm carrying the mechanism is rotated to bring the ejector label carried by the ejector mechanism in contact with the article to be marked and then return the ejector mechanism to its initial position to recycle the same.

6 Claims, 6 Drawing Figures

LABEL DISPENSING APPARATUS

BACKGROUND OF THE INVENTION

I. Field of the Invention

The present invention relates to the field of dispensing adhesive-backed labels to a plurality of articles as they pass by a dispenser and, in particular, the present invention relates to an automatic label dispensing apparatus.

II. Description of the Prior Art

In heavy-duty industrial systems, product identification and control marking are important elements in the process of manufacturing and are required for quality control to identify the source of manufacture of a particular article and/or to identify articles for their subsequent distribution. Numerous methods have been employed in the past to mark articles, such as color-coded ink sprays and manually applied stickers. The introduction of adhesive-backed labels and hand-held, manually operated applicators has greatly facilitated the marking of articles in that the applicators provide a simple means for applying an adhesive-backed label to an article and in which the identifying indicia to be placed upon the label can be simply changed. Such hand-held label applicators are well known and used extensively in the retail industry for marking the price of articles to be sold. Their use, however, in the heavy-duty industrial system is limited because of the necessity for marking many items at a relatively high rate of speed. Their use is further inhibited by the fact that much of the manufacturing processes are automated and persons who would use such a manually operated applicator are occupied with the manufacturing process and are apt not to use the equipment properly or, worse, fail to apply the label to the article whose identification and/or control is important to the manufacturing process. In order to alleviate this problem, Applicant has designed an automatic label dispensing apparatus which utilizes the conventional hand-held label applicator in such a manner as to facilitate the high-speed use of the same in the manufacturing process.

SUMMARY OF THE INVENTION

The present invention, which will be described subsequently in greater detail, comprises an automatic label dispensing apparatus for dispensing a label on an article to be marked as the article is moved by the dispensing apparatus. The dispensing apparatus comprises a horizontal member mounted for rotation about a vertical axis and pivotally supports an arm member adapted for movement along an arcuate path. The arm member, in turn, pivotally mounts the conventional label applicator. A suitable actuating mechanism, such as an air cylinder, is adapted to move the arm member toward the article to be marked such that the injector end of the applicator passes along an arcuate path intersecting the article to be marked, contacts the article and deposits a label thereon. Pivotal movement of the applicator about the end of the arm member permits the tangential contact of the applicator end with the article to be marked. Suitable pneumatic circuitry is provided to actuate the apparatus components in an appropriately timed sequence.

It is therefore an object of the present invention to provide an automatic label dispensing apparatus that is particularly adapted to mount a manually operated label applicator and to use the applicator in an automated fashion to dispense labels for product identification and control marking.

It is a further object of the present invention to provide an automatic label dispensing apparatus of the type described herein which will apply labels to stationary as well as moving articles and which will function on either hard or soft surfaces from a variety of directions as necessary to accommodate the manufacturing process.

It is further object of the present invention to provide a label dispensing apparatus which will be able to sequentially mark parts of varying sizes without the necessity of changing the initial setup of the dispensing apparatus.

Other objects, advantages and applications of the present invention will become apparent to those skilled in the art of label dispensing apparatuses when the accompanying description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
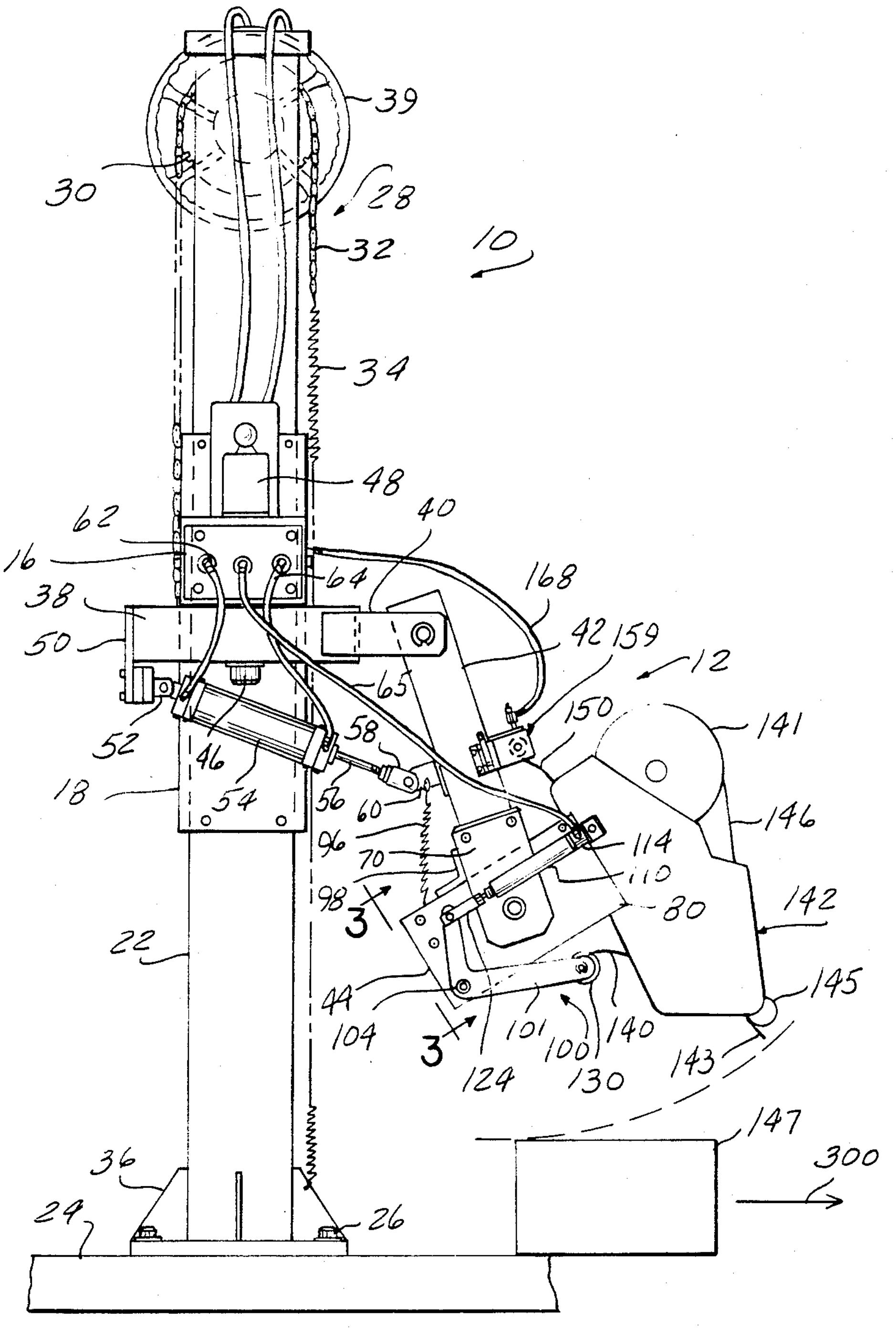
FIG. 1 is a front plan view of an automatic label dispensing apparatus constructed in accordance with the principles of the present invention.
Figure 2:
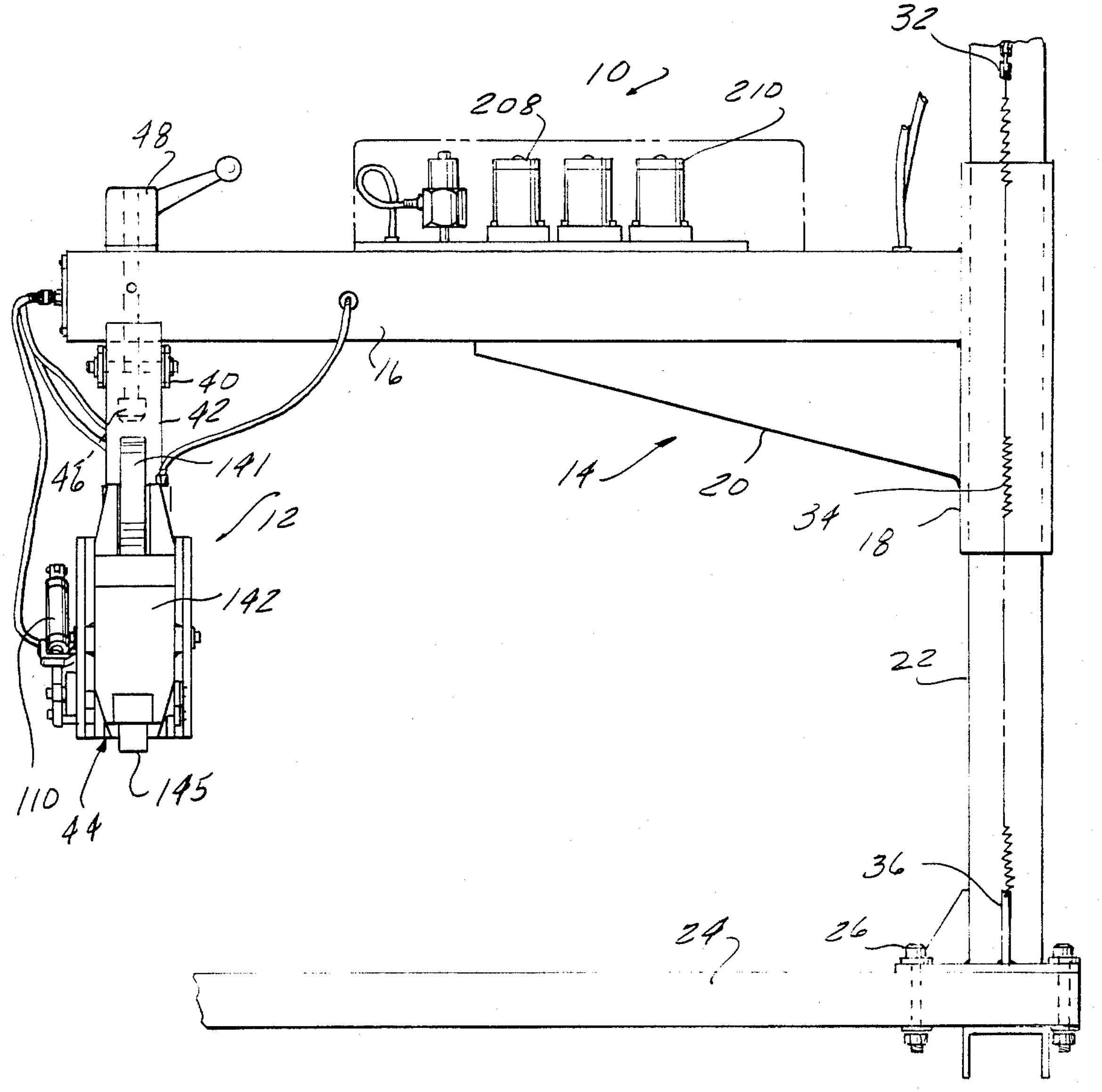
FIG. 2 is a right side elevational view of the automatic label dispensing apparatus illustrated in FIG. 1.

Referring now to the drawings and, in particular, to FIGS. 1 and 2, there is illustrated one example of the present invention in the form of an automatic label dispensing apparatus 10. The apparatus 10 comprises a movable applicator support subassembly 12 that is vertically positionable by means of an L-shaped support 14 (FIG. 2). The L-shaped support 14 comprises a horizontal member 16 that on one end carries the subassembly 12 while its other end is secured to a tubular member 18. Rigidity and support for the horizontal member 16 are provided by a flange 20. The L-shaped support 14 includes a vertical support column 22 that is secured to a work table 24 by suitable means, such as nut and bolt 26 that extend through the lower flange portion 36 of the column 22. The tubular member 18 telescopically engages the vertical support column 22 and may be raised and lowered with respect to the column 22 to permit vertical adjustment in the position of the movable applicator support subassembly 12 with respect to the top surface of the work table 24.

As can best be seen in FIG. 1, vertical adjustment in the height of the horizontal member 16 is controlled by a pulley and chain subasembly 28. The subassembly 28 comprises a sprocket wheel 30 that is rotatably carried within a hollowed out section of the upper portion of the vertical support column 22 and engages a chain 32, one end of which is suitably secured to the tubular member 18, while the opposite end of the chain 32 is attached to a spring 34. The spring 34, in turn, is secured to the lower flange portion 36 of the vertical support column 22. A shaft (not shown) that supports the sprocket 30 extends horizontally through the vertical support column 22 and is supported thereon by suitable bearing means (not shown). The outer extended end of the shaft is fixedly secured to a turning handle 39. It can thus be seen that rotation of the turning handle 39 clockwise as viewed in FIG. 1 will rotate the chain 32 about the sprocket wheel 30, thereby raising the tubular member 18 and thus the horizontal support member 16 upwardly away from the surface of the work table 24. Rotation of the handle 39 in a counterclockwise direction as viewed in FIG. 1 will cause the lowering of the tubular member 18 and, at the same time, exert a tension on the spring 34 which creates a counterweight to support the weight of the horizontal member 16 and the movable applicator support subassembly 12. By appropriately sizing the spring 34 and by providing a suitable amount of frictional engagement between the various aforementioned components, the horizontal member 16 and the subassembly 12 carried thereby can be easily positioned at any vertical location along the length of the support column 22.

The movable applicator support subassembly 12 comprises a rotatably mounted support member 38 having a U-shaped end 40 on which is pivotally carried a radial arm 42, the extending end of which pivotally supports a bracket 44. As can best be seen in FIGS. 1 and 2, the rotatable support member 38 is attached to the extended end of the horizontal member 16 by means of a bolt 46 that extends upwardly through suitable bores (not shown) in the support member 38 and the horizontal member 16 into threaded engagement with a handle 48. It can be seen that when the handle 48 is rotated so as to loosen its threaded engagement with the bolt 46, the support member 38 may be rotated to any desired radial position whereupon the handle 48 may be rotated to tightly engage the bolt 46 and lockingly secure the movable applicator support subassembly 12 in the desired radial position.

The inner end of the rotatable horizontal member 38 opposite the U-shaped end 40 mounts a flange 50 (FIG. 1) which provides a mounting surface for a clevis 52 onto which one end of a cylinder 54 is pivotally secured. The extended end of the piston rod 56 of cylinder 54 has a clevis 58 which pivotally engages a flange member 60 secured to the underside of the radial arm 42. It can thus be seen from inspecting FIG. 1 of the drawings that when a fluid under pressure, such as air pressure, is communicated via the conduit 62 to cylinder 54, the air pressure will act against the piston within the cylinder 54, causing the piston rod 56 to be extended and rotate the radial arm 42 outwardly in a counterclockwise direction. Similarly, when fluid under pressure is communicated via the conduit 64, the piston rod 56 will be retracted, causing the radial arm 42 to swing inwardly toward the cylinder 54, that is, in a clockwise direction as viewed in FIG. 1.

Figure 3:
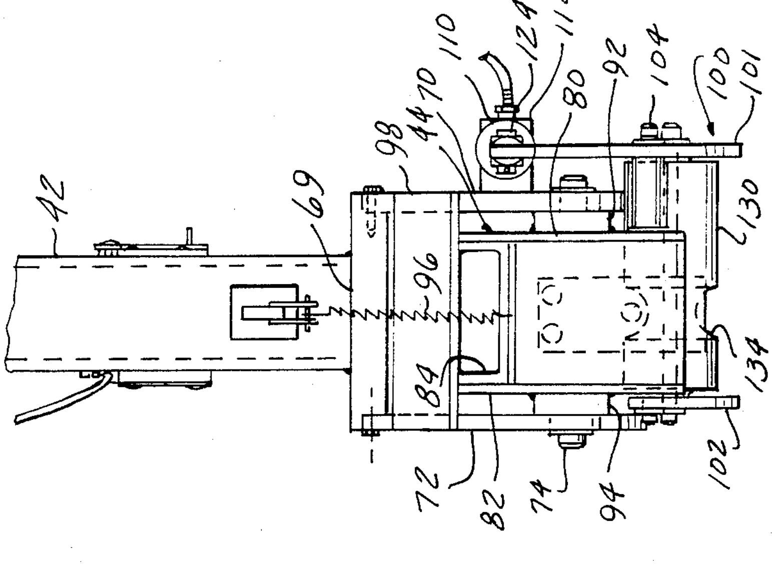
FIG. 3 is an enlarged, fragmentary view of the automatic label dispensing apparatus illustrated in FIG. 1 as seen from line 3—3 of FIG. 1.
Figure 4:
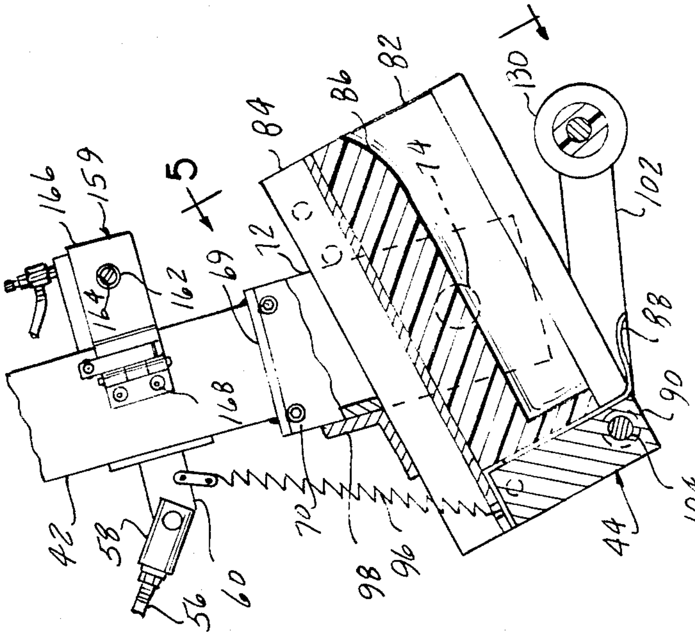
FIG. 4 is an enlarged, fragmentary, cross-sectional view taken along line 4—4 of FIG. 5 and presenting a portion of the automatic label dispensing apparatus shown in FIG. 1 with the manually operated, hand-held applicator removed for clarity.
Figure 5:
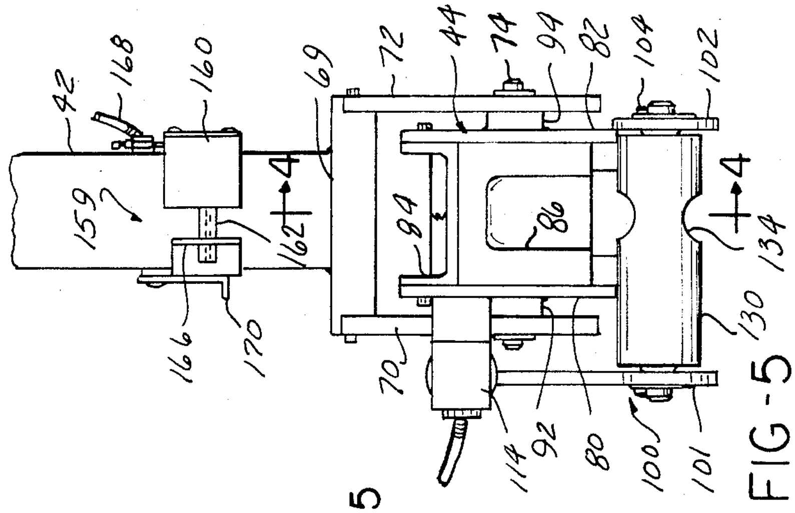
FIG. 5 is an enlarged, fragmentary view of the automatic label dispensing apparatus as seen from line 5—5 of FIG. 4.

Referring now to FIGS. 3, 4 and 5 for a more detailed description of the lower end of the radial arm 42 and the pivot bracket 44 carried thereby, it can be seen that the lower end of the radial arm 42 is enlarged at 69 to define a U-shaped end having projecting legs 70 and 72 that have aligned apertures through which a support shaft 74 is rotatably mounted and which, in turn, supports the bracket 44. The bracket 44 is comprised of outer plate members 80 and 82 which are secured at their rear ends by U-shaped element 84 so as to sandwich a U-shaped plastic holster 86 between the opposing faces of the plates 80 and 82. The lower portion of the bracket 44 supports a clip 88 (FIG. 4) that is secured to the lower portion by means of plate 90. The outer surfaces of the plate members 80 and 82 have enlarged bosses 92 and 94, respectively, which act as bushings to provide for the pivotal movement of the bracket 44 about the shaft 74.

As can best be seen in FIGS. 3 and 4, the lower edge of U-shaped member 84 of the bracket 44 is apertured to receive one end of a spring 96, while the opposite end of the spring 96 is secured to the radial arm flange member 60, whereby a bias is exerted on the bracket 44 to urge the same to the position illustrated in FIG. 4. An L-shaped stop member 98 fixedly secured to the back side of the U-shaped member 84 abuts the lower edges of the U-shaped legs 70 and 72 of the radial arm 42, limiting counterclockwise rotational movement of the bracket 44 (as viewed in FIGS. 1 and 4). When a force, as will be described hereinafter, is exerted upon the pivot bracket 44 to cause the same to rotate in a counterclockwise direction, an increased bias will be exerted upon the spring 96 to urge the bracket 44 to the initial stop position illustrated.

The bracket 44 mounts an arming mechanism 100, the purpose of which will be described hereinafter. The arming mechanism 100 comprises an L-shaped member 101 and a slave member 102 which are pivotally secured to a pivot shaft 104 that extends through the lower plate 90 of the bracket 44. As can best be seen in FIG. 3, the arming mechanism shaft 104 extends outwardly from the outside surface of the bracket 44 a sufficient amount so as to accommodate the mounting of cylinder 110 outside of the radial arm U-shaped bracket leg 70. One end of the cylinder 110 is secured to a support bracket 114 which, in turn, is fixedly attached to the outside surface of plate member 80 and movable therewith. The piston rod end of cylinder 110 mounts a clevis 124 which is pivotally secured to the extended end of one leg of the L-shaped member 101. The extended ends of the members 101 and 102 rotatably support a roller 130 which, in turn, has an annular groove 134. The cylinder 110 is connected to fluid pressure, such as compressed air, via conduit 65.

The cylinder 110 has an internal spring mechanism which biases its cylinder rod to the retracted position illustrated in FIG. 1 wherein the roller 130 of the arming mechanism abutting and snugly engages the trigger 140 of a conventional label ejection mechanism 142. The label ejection mechanism 142 is commercially available and operates in a well-known manner. The ejection mechanism 142 includes a body 146 that rotatably mounts a roll 141 of individual adhesive-backed labels 143 which are fed into an internal ejection mechanism and are serially ejected onto a roller 145 each time the trigger 140 of the ejector mechanism 142 is depressed and released. Each individual label 143 is presented for contact with an article 147 by first being positioned at the roller end of the mechanism 142 and will remain at the roller end until actual contact with the article 147 is achieved.

The individual labels are conventionally carried by a paper tape 150 and the paper tape 150 is ejected through the rear portion of the ejector mechanism after a label 143 is removed therefrom. In normal manual operation the ejector mechanism 142 is manually operated with the trigger 140 being depressed and released manually while the used paper tape 150 is exhausted through the rear end of the mechanism 142 and torn off and discarded from time to time. In the industrial application proposed herein, it is necessary to provide a device 159 for collecting the exhausted label carrier tape 150 so as not to interfere with the operation of the mechanism 142 or the work that is being performed nearby.

In use, the conventional label ejection mechanism 142 is inserted into the holster 86 which, as hereinbefore described, has a shape that is complementary to the shape of the ejector mechanism handle and trigger 140 so as to snugly and securely receive the mechanism 142 therein. As can best be seen in FIG. 4, the clip 88 prevents forward movement of the lower portion of the mechanism handle when a force is exerted against the ejector roller 145. A suitable clamping mechanism (not shown) can be utilized to further secure the ejection mechanism 142 into the holster 86, if desired.

As can best be seen in FIG. 1, when the ejection mechanism 142 is securedly disposed within the holster 86, the roller groove 134 firmly abuts the trigger 140 and is adapted for relative movement against the trigger 140 when the cylinder 110 is activated.

As hereinbefore indicated, the labeling dispensing apparatus is provided with a device 159 for storing the used label carrier tape 150 in the form of an air motor 160 (FIGS. 4 and 5) that is mounted to the outside surface of the radial arm 42. The air motor 160 has a slotted shaft 162 that extends through an aperture 164 in a swing plate 166. The swing plate 166 is hingedly attached by suitable fasteners 168 to the side surface of the radial arm 42 and is secured in the position illustrated by clamp 170 that is pivotally mounted to the radial arm 42 by screw 167 and is adapted to move from the position illustrated, wherein the clamp 170 clampingly engages the outer surface of the swing plate 166 to keep the same in position, to a raised position that permits the swing plate 166 to swing outwardly and expose the slotted shaft 162. When in use, the exhausted label carrier tape 150 is secured to the slotted shaft 162 and the air motor 160 is driven by compressed air supplied thereto through conduit 168. The air motor 160 exerts a constant bias on the shaft 162 to wind the exhausted label carrier tape 150 thereon during use. Only a slight rotational force need be exerted upon the shaft 162 to wind the tape thereon without breaking the same.

Figure 6:
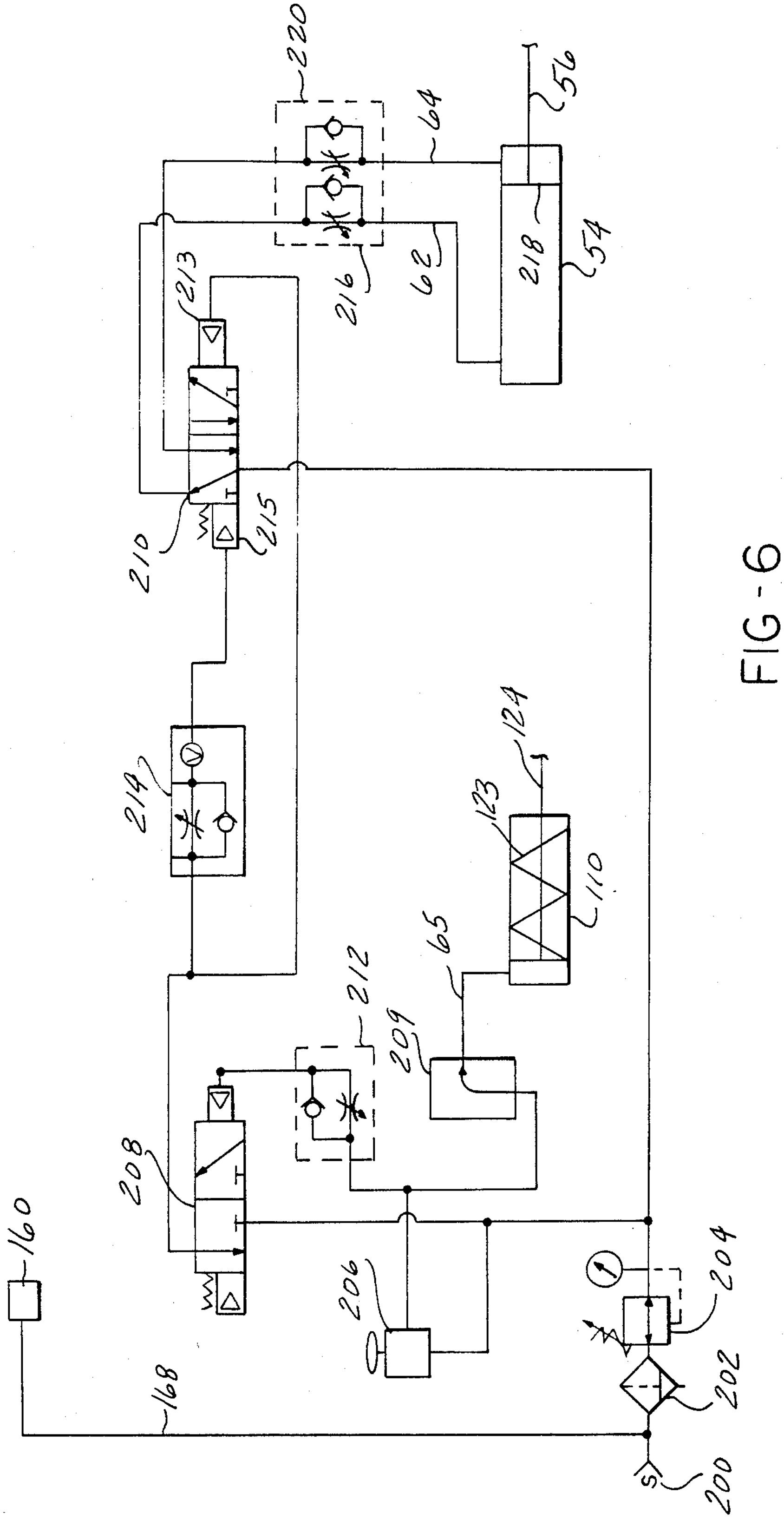
FIG. 6 is a schematic diagram of one example of the pneumatic system that may be employed with the automatic label dispensing apparatus illustrated in FIGS. 1 and 2 of the drawings.

Referring now to FIG. 6, there is illustrated a schematic diagram of the pneumatic system that may be employed in operating the inventive automatic label dispensing apparatus 10. The circuitry illustrates a source 200 of fluid under pressure, such as compressed air. A portion of the air pressure is diverted to drive the air motor 160, while air is also passed through an air filter 202 and a pressure regulator 204. The air exhausted from the pressure regulator 204 is diverted to a pilot valve 206 and the inlet ports of directional control valves 208 and 210. The output from the pilot valve 206 is directed via pulse valve 209 to the inlet side of cylinder 110 which will function to actuate the arming mechanism 100; that is, when cylinder 110 is expanded, the piston rod thereof will exert a force against the L-shaped member 101 to rotate the same counterclockwise about the support shaft 104 as viewed in FIG. 1. The rotation of the member 101 in a counter-clockwise direction depresses the label ejection mechanism trigger 140. Pressure is relieved from cylinder 110 in approximately one-tenth of a second whereby the air cylinder spring 123 returns the air cylinder 110 to its retracted position and releases the trigger 140. This presents an adhesive-backed label 143 against the roller 145 whereby the label 143 is in the proper position to be attached to an article to be marked when the same comes into contact with the label, as will be described.

Fluid from the pilot valve 206 is directed through a flow control valve 212, the output of which provides a pilot signal for the directional control valve 208. Directional control valve 208, in turn, has a fluid conduit that communicates directly with the pilot control port 213 of the second directional control valve 210 and indirectly with the remaining pilot control port 215 of the directional control valve 210 via a flow control valve 214. Directional control valves 208 and 210 are both spring biased to the positions illustrated in FIG. 6. Pressure fluid diverted from the pressure regulator 204 is communicated to the directional control valve 210; and when the valve is properly shifted, as will be described hereinafter, pressure fluid is communicated via flow control valve 220 and conduit 64 to one side of the internal piston 218 of cylinder 54 so as to retract the cylinder 54, whereby the piston rod 56 thereof acts to retract into the cylinder 54 and rotate the radial arm 42 in a clockwise direction illustrated in FIG. 1. When valve 210 is shifted, pressure fluid is directed via flow control valve 216 and conduit 62 to the opposite side of the piston 218 whereupon the piston rod 56 is extracted from the cylinder 54, causing the radial arm 42 to rotate counterclockwise as viewed in FIG. 1 of the drawings.

Referring now to FIGS. 1, 2 and 6 for a description of the operation of the inventive automatic label dispensing apparatus 10, in normal operation the apparatus 10 is mounted adjacent the flow path of the articles that are desired to be marked. For example, in the manner illustrated in FIG. 1 of the drawings, the article 147 to be marked would be on a conveyor that moves the article 147 from left to right, as view in FIG. 1 and as schematically illustrated by the arrow 300. It should be understood that since the rotational arm 38 permits the positioning of the radial arm 42 and thus the ejector mechanism 142 in a variety of positions, the position at which a label 143 is to be deposited upon the moving article 147 or the manner in which the apparatus is located with respect to the moving article 147 can be greatly varied as needed to accomplish the desired marking result. It should also be noted that the arm 16 and its associated tubular member 18 can be fixedly secured to the support column 22 as the application dictates. It should also be noted that the vertical support column 22 may be mounted horizontally whereby the apparatus 10 may be utilized to mark items selectively from top, bottom or side, depending upon the desired application, it being understood that the disclosed embodiment is for purposes of illustration only and not meant to be limiting as to the manner in which the apparatus 10 may be employed to perform a marking operation.

In the embodiment illustrated, it is assumed that an operator of a particular workpiece will determine when the marking operation will occur by depressing the pilot valve 206; however, it should be understood that the pilot valve 206 is representative of other types of mechanisms, such as a variety of conventionally available sensing devices which trip the circuit when an article to be marked passes thereby. It should also be understood that in many industrial applications work is being performed on a particular workpiece by an operator; and upon the completion of the operation, the operator can have an item marked simply by pressing a pilot valve while continuing to perform additional operations either on the workpiece or the next workpiece in line to be operated upon.

In the version illustrated, marking is commenced by depressing the pilot valve 206. Fluid under pressure is directed from the pilot valve 206 to the cylinder 110 whereby the piston rod therein is extended from the cylinder 110 and the action depresses the trigger 140 of the injector mechanism 142. Approximately one-tenth of a second after the pilot signal has been applied to the cylinder 110, valve 209 actuates, causing cylinder 110 to retract under the action of its internal spring 123, resulting in the trigger 140 returning to its original released position whereupon the label 143 is ejected from the ejection end of the ejection mechanism 142 and is positioned on roller 145, ready to contact an article to be marked. It should be noted that it is conventional in ejector mechanisms of the type described that actuation of the trigger simply arms the machanism in the sense that the label is exposed; and upon manipulation of the ejection mechanism, the label can be brought into contact with the article to be marked. In conventional use of the ejective mechanism 142, this is accomplished by manual movement of the operator's hand.

Valve 208 is delayed in being energized by the circuitry as fluid passing through the flow control valve 212 is utilized to shift valve 208. Upon the shifting of valve 208, fluid under pressure from the pressure regulator 204 is communicated to valve 210, shifting the same so as to communicate fluid under pressure to the right side of the cylinder 54, thereby retracting the cylinder piston 56 into the cylinder 54 and causing the radial arm 42 and the associated ejector mechanism 142 carried thereby to rotate in a clockwise direction, as viewed in FIG. 1. The rate of retraction is controlled by the valve 220. As the radial arm 42 drives the ejection mechanism 142, the label 143 thereof will come into contact with the article to be marked, depositing the same upon that article. Upon contact of the end of the ejector mechanism with the article, the pivot bracket 44 will rotate (counterclockwise as viewed in FIG. 1) about the shaft 74, permitting the mechanism 142 to pass by the article without undue pressure being exerted against the same. The swinging of the arm 42 in a clockwise direction at the same time the pivot bracket 44 rotates in a counterclockwise direction results in a tangential contact of the ejector roller 145 and thus the label 143 with the article to be marked, ensuring a simple, efficient and safe contact without damage to the article or the apparatus 10.

Fluid passing via valve 214 resets valve 210 to the position illustrated in FIG. 6. The time delay necessary to permit the full motion of the marking mode to take place is controlled by valve 214 and appropriate setting of the adjustments in the conventional manner can achieve this result. When valve 210 is shifted to its original position, fluid under pressure is communicated from the pressure regulator 204 to the left side of the piston 218 via flow control valve 216 and conduit 62 and the piston rod 56 is extended to the original position illustrated in FIG. 1 wherein the radial arm 42 and the mechanism 142 carried thereby are raised to an elevated position ready to recycle. Releasing of the pilot valve signal, which is the situation described had been manually applied, resets the entire cycle and the cycle may be repeated again upon reactuation of the pilot valve 206.

It can thus be seen that Applicant's invention has provided a new and improved automatic label dispensing apparatus which has particular application to heavy-duty industrial systems offering a practical, low-cost solution to the automatic, in-process dispensing of labels for product identification and control marking.

While only one form of the present invention has been disclosed, it should be understood by those skilled in the art that other forms of Applicant's invention may be had, all coming within the spirit of the invention and scope of the appended claims.

What is claimed is:

1. An automatic label dispensing apparatus for dispensing a label on an article to be marked, said apparatus comprising:

- a label applicator having an ejector end at which a label is adapted to be positioned upon actuation of said applicator, said positioned label being adapted for contact with an article to be marked thereby;
- first actuating means for activating said label applicator;
- a first support member;
- an arm member having one end pivotally carried by said support member, the other end extending therefrom;
- an applicator support member pivotally carried by said other end of said arm member, said label applicator being carried by said applicator support member and movable therewith;
- second actuating means for pivoting said arm member such that said ejector end of said applicator moves in a first direction along an arcuate path and into contact with said article to be marked, said support member being pivotally movable in a second direction opposite said first direction upon contact of said ejector end of said applicator with said article to be marked such that said ejector end tangentially contacts said object and deposits said label thereon;
- a trigger mechanism, the actuation of which positions said label at said ejector end; said first actuating means comprising a roller mechanism pivotally carried by said applicator support member and having a grooved surface engaging said trigger mechanism and cylinder means responsive to fluid pressure to pivot said roller toward said trigger mechanism to actuate said label applicator, said cylinder means being operable to move said roller mechanism in the opposite direction to deactivate said applicator, said cylinder means and pivotally mounted roller being carried by said applicator support member.

2. The automatic label dispensing apparatus defined in claim 1 further comprising a horizontally disposed support member on which said first support member is rotatably mounted about a vertical axis, means for locking said first support member in any one of a plurality of radially disposed positions.

3. The automatic label dispensing apparatus defined in claim 2 wherein said second actuating means comprises a fluid cylinder having one end carried by said first support member and another end carried by said arm member.

4. The automatic label dispensing apparatus defined in claim 3 wherein said fluid cylinder is normally in an extended position and said fluid cylinder is contracted to rotate said arm member from a first raised position with respect to the article to be marked to a second lowered position with respect to the article to be marked wherein said ejector end contacts said article to be marked.

5. The automatic label dispensing apparatus defined in claim 4 comprising first fluid valve means operable upon actuation to energize said second actuating means to arm said applicator so as to present said label at said applicator ejector end, second valve means operable in response to said first valve means for energizing said second actuating means for moving said arm member from said raised position to said lowered position, and third valve means operable to extened said cylinder to raise said arm member from said lowered position to said raised position after said label has been deposited upon said article.

6. The automatic label dispensing apparatus defined in claim 2 wherein said horizontally disposed member is attached to a tube member; a vertical support column, said tube member being telescopically carried by said vertical support member such that the distance between the article to be marked and said ejector may be selectively varied; and means for raising and lowering said horizontally disposed member along said vertical column.

* * * * *